United States Patent [19]

Perreault et al.

[11] 4,225,937
[45] Sep. 30, 1980

[54] METHOD AND APPARATUS FOR SUPPRESSION OF ERROR ACCUMULATION IN RECURSIVE COMPUTATION OF A DISCRETE FOURIER TRANSFORM

[75] Inventors: Donald A. Perreault, Thousand Oaks; Thomas C. Rich, Redondo Beach, both of Calif.

[73] Assignee: Xerox Corporation, Stamford, Conn.

[21] Appl. No.: 943,085

[22] Filed: Sep. 18, 1978

[51] Int. Cl.$^2$ .............................................. G06F 15/34
[52] U.S. Cl. ................................................... 364/726
[58] Field of Search ................................. 364/726, 724

[56] References Cited

U.S. PATENT DOCUMENTS

| | | | |
|---|---|---|---|
| 3,749,895 | 7/1973 | Kao | 364/724 X |
| 3,997,770 | 12/1976 | Claasen et al. | 364/724 |
| 4,023,028 | 5/1977 | Dillard | 364/726 |
| 4,080,661 | 3/1978 | Niwa | 364/726 |

*Primary Examiner*—Jerry Smith

[57] ABSTRACT

To limit the accumulation of recursive computation errors while recursively calculating the discrete Fourier transform of an input signal in response to moving window sample sets of that signal, the dependent variables for the recursive calculations are periodically refreshed. One embodiment generates an error limited continuous discrete Fourier transform of the input signal through the use of duplicate channels which are periodically reinitialized in time staggered relationship and alternately switched on-line and off-line in time synchronism with the reinitialization process. Each of the channels of that embodiment is equipped to recursively calculate the discrete Fourier transform of the input signal so that while one channel is on line feeding recursively calculated transform coefficients to the outputs, the other channel or channels are off-line being reinitialized and then computing fresh sets of transform coefficients for subsequent on-line recursive calculations. Another embodiment performs essentially the same function through the use of an on-line main processing channel which recursively calculates the discrete Fourier transform coefficients of the input signal on the basis of successive sets of dependent variables which are computed in and supplied by a periodically reinitialized off-line auxiliary processing channel.

29 Claims, 16 Drawing Figures

METHOD AND APPARATUS FOR SUPPRESSION OF ERROR ACCUMULATION IN RECURSIVE COMPUTATION OF A DISCRETE FOURIER TRANSFORM

BACKGROUND OF THE INVENTION

1. Field of the Invention

This invention relates to the calculation of a discrete Fourier transform of a periodically sampled signal. The invention may be utilized in many fields, such as in a frequency domain equalizer for information transmission channels.

2. Description of the Prior Art

Most prior art computations of a discrete Fourier transform require that all signal samples be available. In such systems, computations must be delayed until the signal of interest has been completely received. There is disclosed in the literature, however, a recursive computation of the discrete Fourier transform using the concepts of "moving window sampling" which need not wait until the end of data transmission prior to commencing the calculations. See, for example, George M. Dillard, "Recursivve Computation of the Discrete Fourier Transform with Applications to a Pulse-Doppler Radar System," *Computers and Electrical Engineering*, Vol. 1, pp 143-152, Pergamon, Oxford, 1973 and "Recursive Computation of the Discrete Fourier Transform with Applications to an FSK Communication Receiver", 1974 *National Telemetering Conference Record*, pp 263-265.

Situations occur in modern technological environments where it is desireable to perform recursive computations on various signals or functions. One such situation is in automatic equalization of transmission channels. When the equalization is carried out in the frequency domain, recursive computation of the discrete Fourier transform provides advantages, such as savings in time and minimization of hardware. Equalization of transmission channels in the prior art is generally conducted, however, in the time domain. The use of frequency domain equalization is not widespread, partly because of the common perception that the initialization of the equalization process must be delayed to allow for the reception of a complete characterization of the signal which is to be equalized. Moreover, prior attempts at applying recursive computations of the discrete Fourier transform to frequency domain equalizers have suffered from a tendency for errors to buildup, a problem common to recursive procedures. If errors occur in early computations, the use of the calculated coefficients in subsequent computations typically leads to amplification of the errors. Such error accumulation and amplification is likely to lead to intolerably erroneous results.

SUMMARY OF THE INVENTION

This invention overcomes the major disadvantages of using moving window sampling to recursively compute the discrete Fourier transform of an input signal for, say, equalization purposes.

It is, therefore, a primary object of the invention to provide a method for accurate computation of the discrete Fourier transform of a signal, while avoiding the problems associated with the prior art.

An additional object of the invention is to generally limit error accumulation in a recursive computation.

Yet another object of the invention is to provide apparatus for carrying out a recursive computation of the discrete Fourier transform of a signal.

It is a further object of the invention to provide means for limiting the accumulation of errors in an apparatus recursively calculating the discrete Fourier transform of a signal.

Yet another object of the invention is to provide an apparatus for recursively calculating, with limited recursive calculation error, the discrete Fourier transform of a sampled signal utilizing a moving window sampling approach.

The present invention overcomes the disadvantages of the prior art and achieves the foregoing objectives by providing one or more periodically reinitialized channels for recursively calculating, with limited recursive calculation errors, the discrete Fourier transform of an input signal in response to moving window sample sets of that signal. A single channel is sufficient to generate an error limited discontinuous transform, but a plurality of channels are needed if an error limited continuous transform is desired due to the finite amount of time a reinitialized channel requires to recalculate a complete set of the dependent variables which enter into the recursive calculations.

One embodiment of this invention generates an error limited continuous discrete Fourier transform of the input signal through the use of duplicate channels which are periodically reinitialized in time shaggered relationship and cyclically connected to and disconnected from the output, one after the other, in timed synchronism with the reinitialization timing. Each of the channels is equipped to recursively calculate the discrete Fourier transform of the input signal in response to moving window sample sets of that signal so that while one channel is on-line feeding transform coefficients to the output, the other channel or channels are off-line being reinitialized and computing fresh transform coefficients. Another embodiment performs essentially the same function by having a main processing channel which remains on-line to feed recursively recalculated transform coefficients to the output on the basis of successive sets of dependent variables which are recursively calculated in and supplied as calculated by a periodically reinitialized off-line auxiliary processing channel. Recursive computation errors are limited in both embodiments by periodically reinitializing the channel or channels which furnish the dependent variables which enter into the recursive calculations of the discrete Fourier transform coefficients.

BRIEF DESCRIPTION OF THE DRAWINGS

Other objects and features of the invention will become apparent when the following detailed description is read in conjunction with the attached drawings, in which:

FIG. 7, which is composed of FIGS. 7A and b, is a timing chart for the switches shown in FIGS. 5 and 6;

DETAILED DESCRIPTION OF THE INVENTION

While the invention is described hereinafter in some detail with reference to certain illustrated embodiments, it is to be understood that there is no desire to limit it to those embodiments. On the contrary, the intent is to cover all modifications, alternatives, and equivalents falling within the spirit and scope of the invention as defined by the appended claims.

Figure 1:
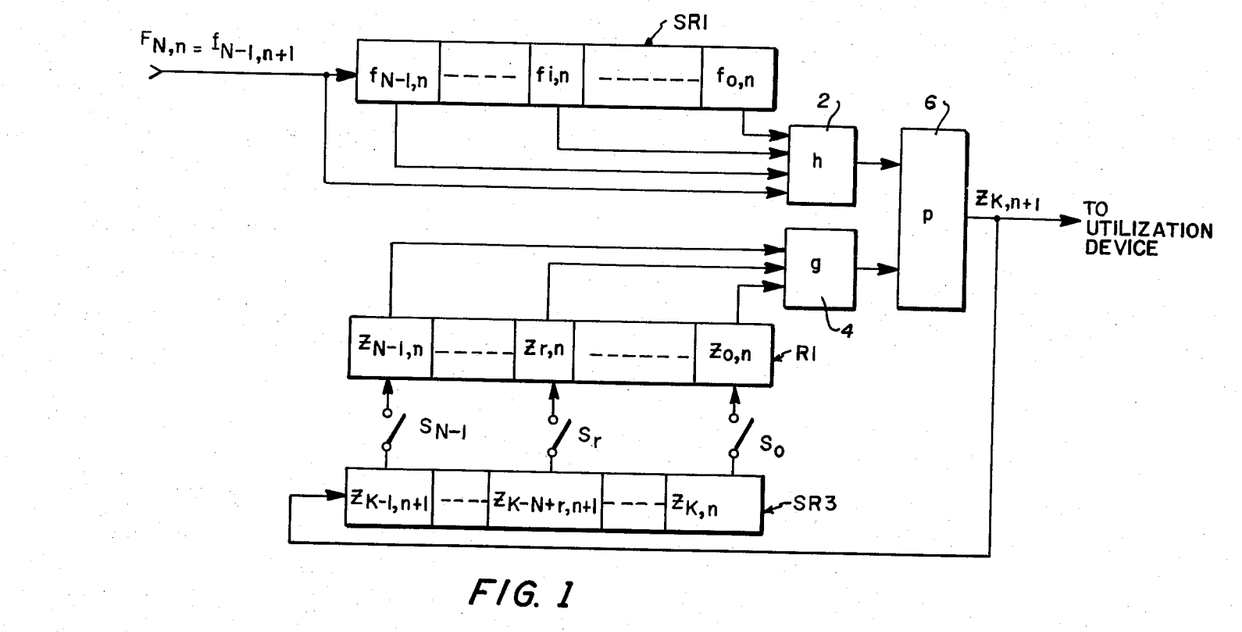
FIGS. 1-3 are block diagrams of systems for solving a general recursive equation.

FIG. 1 illustrates a system for solving a typical recursive function, such as that described by the equation, $$Z_{k,n+1} = p_k[\{g_r(Z_{r,n})\}, \{h_i(f_{i,n})\}] \qquad (1)$$

where
$r = 0, 1, \ldots N-1$
$i = 0, 1, \ldots N;$ and
$k = 0, 1, \ldots N-1$

Equation (1) describes a particular output $Z_{k,n+1}$ as a function $p_k$ of two arguments requiring further computations. Specifically, computation involving $Z_{r,n}$ (where r is an index; $0 \leq r \leq N-1$) and a time sampled input function $f_{i,n}$. The second subscript, n, used in identifying the symbols relates to the "window" or "frame" in which the first subscript ranges. Thus, where a sampled time function f(t) is observed in specified time "frames", and where N samples are observed during each frame, the $i^{th}$ sample in time frame n is denoted by $f_{i,n}$. In the broadest sense, $Z_{k,n+1}$ is a function of the sets of functions denoted by $g_r(Z_{r,n})$ and $h_i(f_{i,n})$. A different function $g_r$ operates on each argument $Z_{r,n}$. Similarly, a different function $h_i$ operates on each of the time samples $f_{i,n}$.

The import of equation (1) is apparent when consideration is given to the dependence of the $k^{th}Z$ function in time frame n+1 on (a) the Z functions (used as arguments and N in number) in the $n^{th}$ frame and (b) the N samples of f(t) in the $n^{th}$ frame. By definition there are but N samples of the time function in any given frame, as the index i ranges over $0, 1, \ldots N-1$. Thus, the sample identified by the index $i=N$ is outside a particular frame n, but is equivalent to the $N-1^{th}$ sample of the succeeding frame $n+1$. Thus, $$f_{N,n} = f_{N-1,n+1} \qquad (2)$$

In the recursive technique set forth herein, successive sample frames overlap. Hence, if the samples f are labeled in a continuous manner without renumbering at each frame, the first frame comprises samples $f_0, f_1 \ldots f_{N-1}$, the second frame comprises samples $f_1, f_2 \ldots f_N$, the third comprises samples $f_2, f_3 \ldots f_{N+1}$ and so forth. As will be appreciated, the utilization herein of a continuous sample index $i=0,1 \ldots N$ and of a separate frame index n permits the desired mathematical description to be set forth in terms of a recursive formula.

Equation (1) assumes that, in the general case, there will be a specific function $h_i$ of each sample. Moreover, it is further assumed that in the general case there will be a separate function $g_r$ of each of the dependent variables, Z. Thus, a specific function $h_i$ of the observed variable is combined with a different, specific function $g_r$ of the dependent variable according to a specific function $p_k$ to provide the current value of one of the dependent variables Z for the current time frame.

The apparatus of FIG. 1 may be utilized to implement equation (1) by using an input register or shift register SR1 to store samples of the observed variables. The contents of the register SR1 are shown at a time immediately following the last sample of the $n^{th}$ frame, so that the stored samples include $f_{0,n} \ldots f_{N-1,n}$. The outputs of the shift register SR1 are provided as inputs to function generator 2 realizing the functions h. Additionally, the next sample $f_{N,n} = f_{N-1,n+1}$ is fed to function generator 2 as required by equation (1). A second function generator 4, realizing the functions g, receives as inputs the the values of the dependent variables Z for the particular frame of interest. The dependent variables are stored in a feedback register R1. The outputs of the two function generators are provided as inputs to a third function generator 6, which realizes the functions p needed to produce the dependent variables $Z_{k,n+1}$. FIG. 1 further shows that the dependent variables $Z_{k,n+1}$ for the new frame n+1 are input to an output register or shift register SR3. When all the current dependent variables have been calculated and stored in register SR3, switches $S_o \ldots S_{N-1}$ close, thereby providing those variables to feedback register R1 and permitting computation for the next frame. It is noted that, since each of the dependent variables for frame n+1 depend on all the samples of the observed variable for frame n, register SR3 must shift through all N positions for each shift of register SR1. Thus, while the intermediate term in register SR3 is shown as being $Z_{k-N+r, n+1}$, it could be shown with equal validity as being $z_{k-N+r,n}$.

Figure 2:
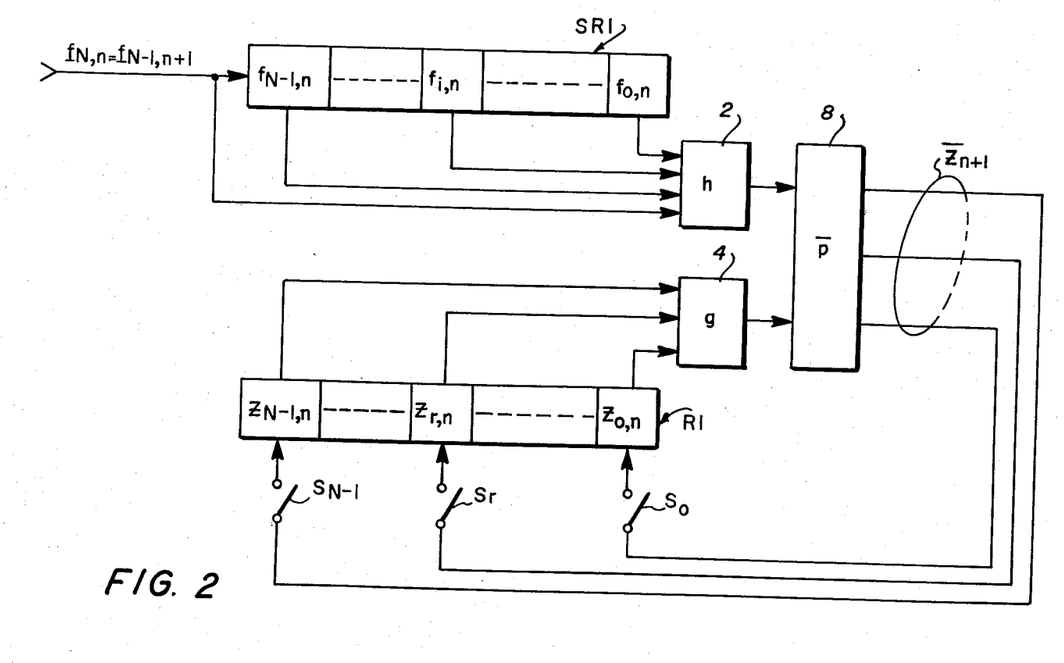

FIG. 2 shows an alternate approach to solving a recursive function, utilizing parallel generation of the various dependent variables. Thus, the symbols $\overline{Z_{n+1}}$ and $\overline{p}$ are used to denote the plurality of dependent variables and functions, respectively, generated by function generator 8. The dependent variables are generated simultaneously and made available to feedback register R1 for storage. Register R1 may comprise solid state devices, magnetic core storage or any other means for storing the information which is generated. A plurality of switches $S_o \ldots S_{N-1}$, shown in the diagram as single-pole, single-throw switches but realizable in terms of any means capable of providing and removing circuit continuity, are used to avoid race conditions and to provide the dependent variables to register R1 at a properly synchronized time.

Figure 3:
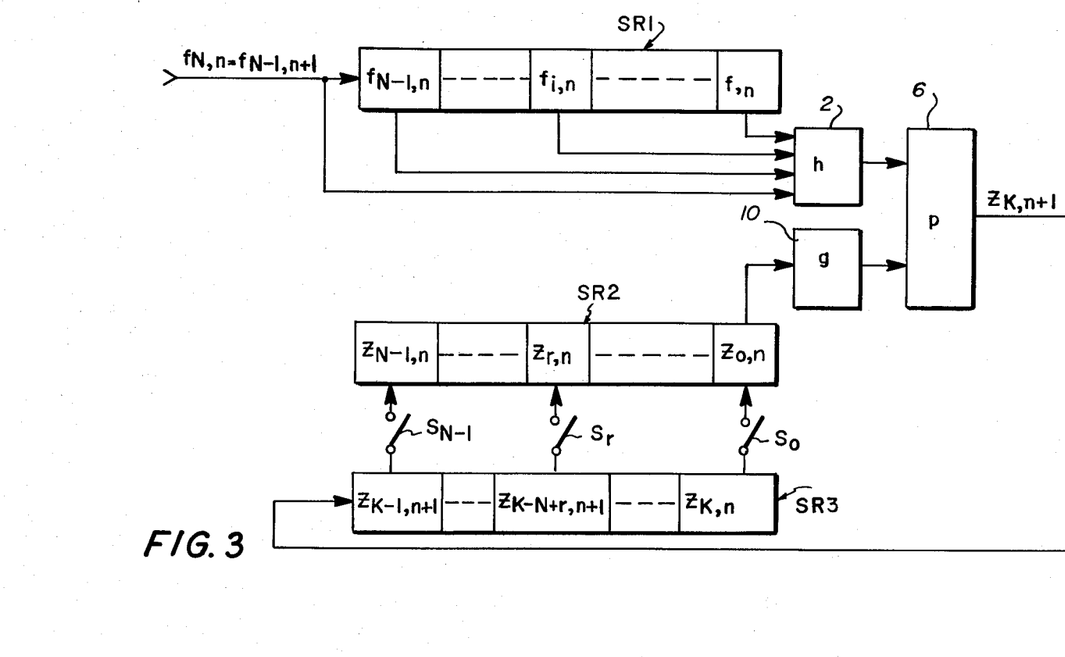

FIG. 3 is a modification of FIG. 1 in which a parallel input/serial output shift register SR2 is used in place of the register R1 shown in the FIG. 1. Thus, a single input is provided to function generator 10 for generating the g functions of the dependent variables of the $n^{th}$ time frame. The p function generator 6 is the same as in FIG. 1, and provides a serial output of the dependent variables for the $(n+1)^{th}$ frame, using a shift register SR3 to provide the variables to register SR2. This embodiment provides a more restricted solution to equation (1) by limiting the index r to the same value as the index k such that:

$$z_{k,n+1} = p_k[\{g_k(Z_{k,n})\}, \{h_i(f_{i,n})\}] \qquad (2A)$$

In keeping with equation (2A), it may be assumed that the recursive function is one in which the $k^{th}$ dependent variable in the $(n+1)^{th}$ frame is dependent only on the $k^{th}$ dependent variable $Z_k$ in the $n^{th}$ frame and all the sampled values of the independent variables $f_i$ in the $n^{th}$ frame. Such a relationship is described as follows:

$$Z_{k,n+1} = p_k[Z_{k,n}\{h(f_{i,n})\}] \tag{3}$$

where
$i = 0, 1, \ldots N$; and
$k = 0, 1, \ldots N-1$.

Inasmuch as the dependent variable $Z_k$ does not "interact" in the recursion, the variable $Z_k$ need not be calculated for all $N$ possible values of the index $k$. Indeed, any subset may be chosen.

In summary, FIGS. 1 through 3 illustrate three permutations available for computing recursive functions. Specifically, the dependent variables may be computed serially or in parallel and may be provided to the respective function generators g in serial or parallel form.

It is known that the discrete Fourier transform (DFT) is described as follows:

$$\overline{Z}_k = \sum_{i=0}^{N-1} f_i W^{ki}, \tag{4}$$

where
$W = \exp.(-j2\pi/N)$;
$k = 0, 1, \ldots N-1$;
$f_i$ are samples of a time function $f(t)$; and
$Z_k$ are the discrete frequency components.

It is shown in the above-referenced articles by Dillard, that a moving window discrete Fourier transform (MWDFT) may be recursively computed from a sequence of samples of a time function as follows:

$$Z_{k,n+1} = [Z_{k,n} + f_{N,n} - f_{0,n}] W^{-k} \tag{5}$$

When the first time sample of the $n^{th}$ frame $f_{0,n}$ is used as a reference point and defined as $f_n$, a succeeding $i^{th}$ sample in the $n^{th}$ frame may be expressed as:

$$f_{i,n} = f_{i+n} \tag{6}$$

The labeling of samples in succeeding time frames continues sequentially; for example, $f_{i,n+N} = f_{i+n+N}$. This provides a single subscript notation for labeling the time samples, thereby permitting the window index to be omitted from the time samples. Accordingly, equation (5) may be rewritten as:

$$Z_{k,n+1} = [Z_{k,n} + f_{N+n} - f_n] W^{-k} \tag{7}$$

where
$k = 0, 1, \ldots, N-1$
$n = 0, 1, 2, \ldots$
$Z_{k,0} = Z_k$

In contrast to the general situation described by equation (3), equation (7) shows that only two input samples are needed to determine a complete set of DFT spectral coefficients. Inasmuch as a previous DFT transform $Z_{k,n}$ is always necessary to calculate a subsequent transform $Z_{k,n+1}$, a special procedure is necessary to start up when only the $i^{th}$ sample, $f_i$, is available.

Figure 4:
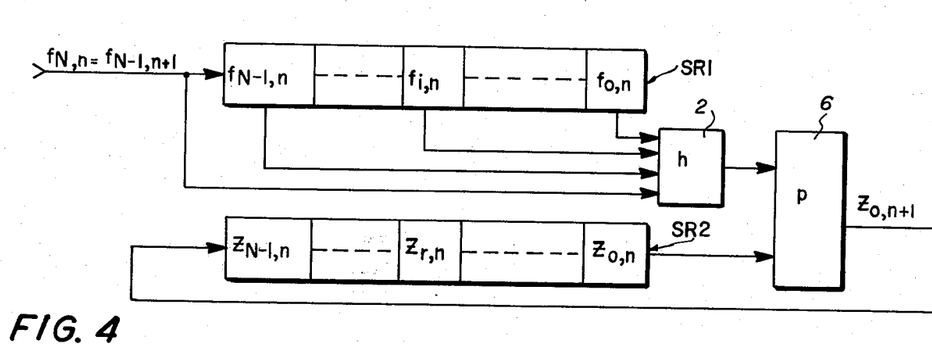
FIG. 4 is a simplification of FIG. 1 for a special form of recursive equation.

Equation (7) is implemented using apparatus 20 of FIG. 4. Apparatus 20 is a modification of the apparatus of FIG. 3, and corresponding elements are identified by common references. Registers SR1 and SR2 are used to store the sampled values of the time function and the computed discrete frequency components, respectively. It is noted that the input register SR1 may have an additional stage to store the first sample $f_{N+n}$ of the next time frame $n+1$. The arrangement shown assumes $f_{N+n}$ is held as a sample long enough to be operated on by the function h and to drive the $N^{th}$ cell of SR1 at shift time. For convenience, the input register SR1 is hereinafter referred to as having an output for supplying the first sample $f_{N+n}$ of the next time frame. Thus, it should be understood that such output may be taken from the input as shown or from an additional storage cell.

Figure 5:
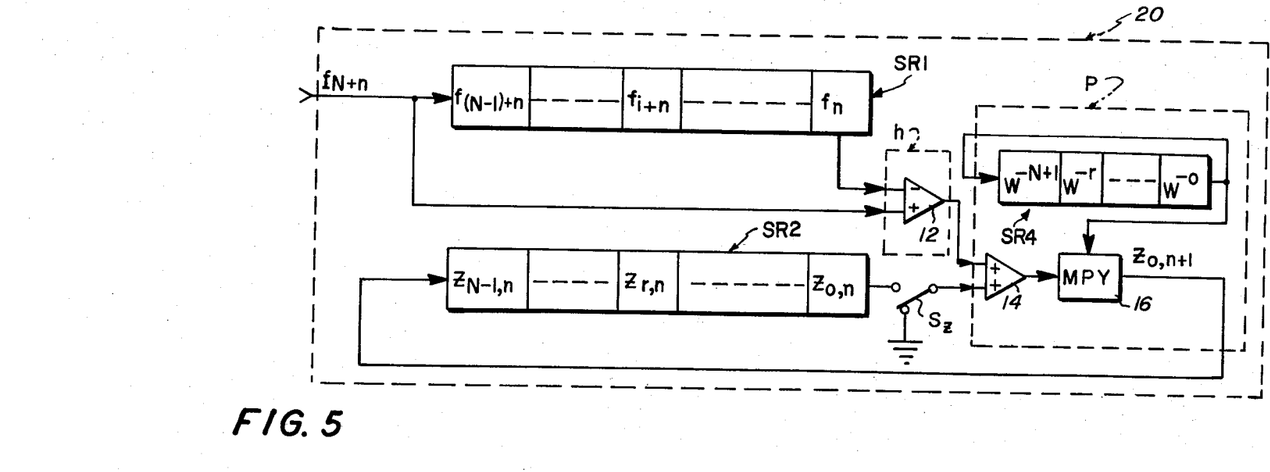
FIGS. 5 and 6 illustrate a first embodiment of the invention for limiting the accumulation of error in the recursive calculation of a discrete Fourier transform.

As illustrated in further detail in FIG. 5, the function h is realized by a simple subtractor 12, shown as a difference amplifier. The function p is realized by an adder 14, a multiplier 16, and an end-around or recirculating shift register SR4. Subtractor 12 provides an output equal to the difference $f_{N+n} - f_n$ as required by equation (7). The difference is sequentially added to the dependent variables $Z_{k,n}$ and the resultant sums are sequentially multiplied in multiplier 16 by successive one of the exponential factors $W^{-k}$ stored in the shift register SR4. The factors in the register SR4 shift in synchronism with the dependent variables stored in the feedback register SR2 and N times as fast as the time samples stored in the register SR1. Thus, as required by equation (7), each shift of the sample values in the input register SR1 is followed by N shifts of the feedback register SR2, and each shift of the register SR2 is associated with appropriate arithmetic calculations. The means for synchronization form no part of this invention and therefore need not be illustrated in detail, but may include a conventional shift pulse generator, or other clocking means.

FIGS. 4 and 5 illustrate the possibility for the accumulation of error in the recursive computation of the moving window discrete Fourier transform. Once an error creeps into the computation of any of the discrete frequency components, $Z_k$, that component is used again in computation of subsequent components, and the errors thus tend to accumulate.

In accordance with this invention, to limit the accumulation of recursive calculation errors, the spectral coefficients $Z_k$ used in the recursive calculations are periodically reconstituted through the use of the recursive formula by periodically reinitializing the calculations with (a) a set of N zeroes (or any other predetermined sequence $\overline{f}_i, i = 0, 1, \ldots, N-1$) in the place of the observed sample values $f_{n+i}, i = 0, 1, \ldots, N-1$, and (b) another set of N zeroes (or the *precalculated* and *error-free* DFT $\overline{Z}_k, k = 0, 1, \ldots, N-1$, of the $\overline{f}_i$ (as defined by equation (4) instead of the corresponding MWDFT $Z_{k,n}$. This procedure assumes that the errors associated with zeroes (or $\overline{f}_i$ and $\overline{Z}_k$) are negligible. In particular, it is desired to periodically reconstitute the spectral coefficients $Z_k$ from the equation $$Z_{k,n+1} = (0 + f_{N+n} + 0) W^{-k} \tag{8}$$

or, more generally, from $$Z_{k,n+1} = (\overline{Z}_k + f_{N+n} - \overline{f}_o) W^{-k} \tag{8a}$$

which is equation (7) with $Z_{k,n} = f_n = 0$ or $Z_{k,n} = \overline{Z}_k$ and $f_n = \overline{f}_o$.

Using equation (8) one generates an error-limited (in the recursive sense) set of values for the dependent variables $Z_{k,n+1}$. However, the dependent $Z_{k,n+1}$ values so calculated are not yet the DFT of a sequence of N signal sample values; it being understood that only $f_{N+n}$ is a signal sample value, the $\bar{f}_i$ are not. Thus, successive sets of partially reconstituted spectral coefficients are generated while holding $f_{n+i} = \bar{f}_i$, for $i = 1, 2, \ldots, N-1$. For the special case when $f_{n+1} = 0$:

$$Z_{k,n+2} = (Z_{k,n+1} + f_{N+n+1} + 0)W^{-k} \quad (9)$$

$$Z_{k,n+3} = (Z_{k,n+2} + f_{N+n+2} + 0)W^{-k}$$

. . .
. . .
. . .

$$Z_{k,n+N} = (Z_{k,n+N-1} + f_{2N+n-1} + 0)W^{-k}$$

where, for each equation, k = one or more of 0,1, ... N−1. For the general case $f_{n+i} = \bar{f}_i$:

$$Z_{k,n+i+1} = (Z_{k,n+i} + f_{N+n+i} - \bar{f}_i)W^{-k} \quad (9a)$$

The choice $\bar{f}_i = 0$ and $\bar{Z}_k = 0$ (all i and k) typically leads to the simplest hardware implementation and is assumed throughout the remainder of the discussion. The advantage of that choice is that only N recursive calculations are required to effectively generate a valid set of spectral coefficients $Z_{k,n+N}$ to be used as an argument in equation (7). The calculated coefficients $Z_{k,n+N}$ are the DFT of a sequence of N signal sample values; the $\bar{f}_i$ having been entirely eliminated. The accumulated computation error does not exceed N recursions, because the precalculated coefficients $\bar{Z}_k$ are error free within the limits of precision of the hardware. By generating these reconstituted spectral coefficients according to equations (8) and (9) and placing the final set of N values of $Z_{k,n+N}$ into the feedback shift register SR2, one may proceed to utilize the apparatus of FIGS. 4 and 5 to implement equation (7) in an error-limiting manner.

Figure 6:
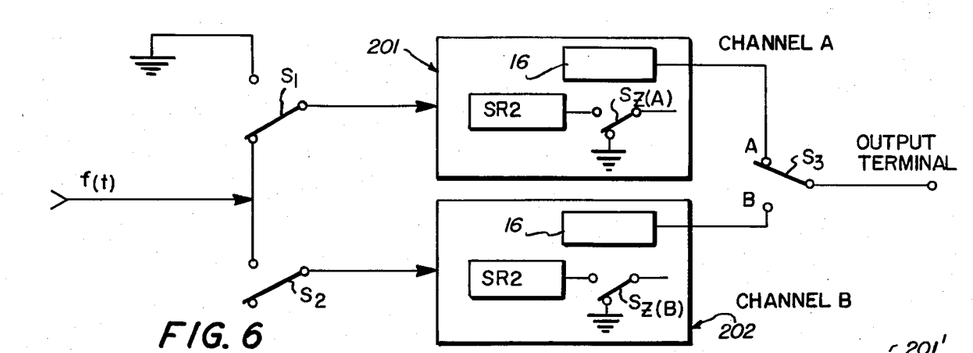

In order to carry out the computations set forth above for $\bar{f}_i = \bar{Z}_k = 0$ (all i and k), a switch $S_z$ is employed at the output of the feedback register SR2 in FIG. 5 in order to provide a zero (grounded) reinitializing value to the adder 14. Additionally, the apparatus of FIG. 5 is duplicated and connected in the switching arrangement as shown in FIG. 6. In FIG. 6, devices similar to apparatus 20 are specified by the addition of a third digit, as 201, 202, etc. The switching arrangement is shown as comprising three single-pole-double-throw switches $S_1$, $S_2$, and $S_3$. Any switching means may be used, however, such as FET's, SCR's, TRIAC's, or other devices capable of selectively making and breaking circuit continuity. If there are eight (8) samples per time frame the switches $S_1$–$S_3$ and $S_Z$ are operated in accordance with the timing diagrams shown in FIG. 7. Nevertheless, it will be appreciated that devices utilizing different numbers of samples/frame are also within the scope of the invention inasmuch as the timing for the switches may be adjusted accordingly. Furthermore, it should be understood that it is also possible to provide limited recursive error accumulation using the computing device 201 and the switch S1 of Channel A alone, if the switch S3 is operated to alternately make and break a connection between the computing device 201 and the output terminal.

Figure 7A:
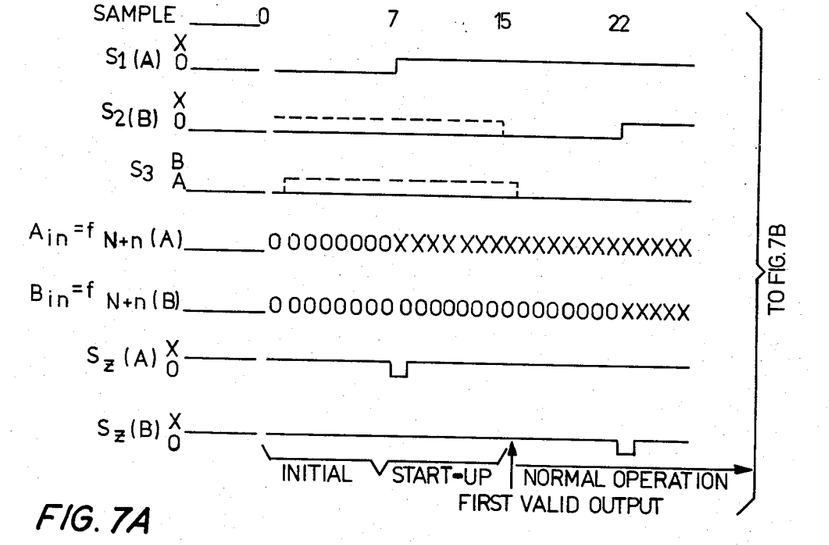
Figure 7B:
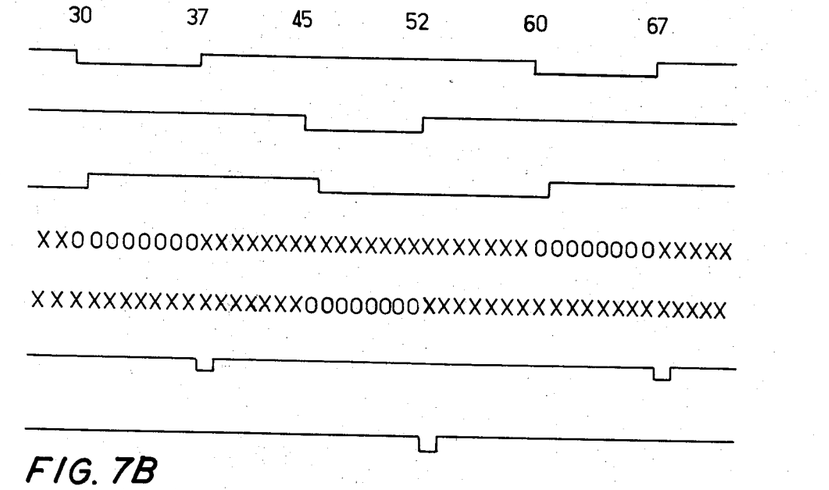

In operation the apparatus of FIG. 6 provides an output from one of the two computing channels A and B, while the other channel is being reset to zero and reinitialized. After reinitialization, the other channel is used to provide the output and the first is reset and reinitialized. Thus, recursive calculation errors in the output are limited. The timing chart of FIG. 7 illustrates the timing operation of switches $S_1$, $S_2$, and $S_3$, as well as the timing of the switches $S_z$ in channel A (device 201) and channel B (device 202). The signals $A_{in}$ and $B_{in}$ which are applied to the first stages of the input shift registers SR1 of channels A and B, respectively, by their associated switches $S_1$ and $S_2$ are illustrated as being composed of signal samples (X) and zero or reinitializing values (0). A similar notation has been used to indicate the times at which the switches $S_z$ of channels A and B are set to pass signal values (X) and reinitializing zero values (0). As is seen from the timing diagram, a refresh cycle for a given channel, say, channel A, involves feeding a successive sequence of N=8 zero values into channel A via switch $S_1$ and then applying N zero values to adder 14 of channel A via the switch $S_z$ of channel A. Thus, at timing interval 38, for example, the input values to subtractor 12 in channel A are, in terms of the recursive equation (7), $f_0 = 0$ and $f_8 = X$ (a sample value), and the input value to adder 14 in channel A is $Z_{k,0} = 0$. The recursive equation thus becomes $$Z_{k,1} = (0 + f_8 + 0)W^{-k}$$

which is precisely the desired equation (8) for n=0, N=8 which begins error-limited spectral reconstruction.

It is noted that the N zero value inputs produced by switch $S_z$ which correspond to $Z_{k,0} = 0$ are produced during one sample interval inasmuch as there are N shifts of the feedback register SR2 for each shift of the input register SR1. Successive shifts of the zero values in the input register SR1 of channel A effectuate equations (9) as desired to rebuild the coefficients to a point where a valid output can be obtained. A valid output is available after all the zero values have been shifted through the register SR1, which occurs after the contents of the register SR1 are shifted during interval 45 in the above example. At this point, switch $S_3$ may be connected to channel A since valid output coefficients $Z_{k,n+1}$ are now available. It should be understood, however, that the output switching between channels A and B may take place at longer intervals than shown in FIG. 7, although larger error buildup may be expected. Alternatively, it is possible to provide more than two channels for the computation, thereby providing for even shorter error accumulation periods, at the expense of added duplication of hardware.

At the outset of a suitable start-up procedure, the input registers SR1 in channels A and B are both initially filled with zeroes. Channel A starts operating at zero time as illustrated in FIG. 7. Channel B also starts at zero time, but its input is held at zero during the first 3N−1 actual input samples. Thus, the first actual sample seen by channel B is the 3Nth sample and the first valid output spectrum from Channel B represents the $3N^{th}$ through $4N-1^{th}$ input samples. At this time the system output is taken from channel B, while the input of channel A is switched to zero for N samples and then returned to the actual input. When channel A is again providing a valid spectrum, the output is again taken from channel A and channel B is switched to zero for N samples. Thus, each channel is repeatedly and alternately "refreshed" to eliminate accumulated errors and the output is taken alternately from the two channels as appropriate. As a result, no computation error can be carried through more than 2N-1 spectrums or, in other words, 3N-2 recursions.

Alternatively, at start-up, the switches $S_2$ and $S_3$ may be operated in the same synchronism with the switch $S_1$ as in normal operation. In that event, as illustrated by dotted lines in FIG. 7, the only special control action required at start-up involves forcing entry into the sequence at the point at which $S_1$ is set to fill the input register SR1 of channel A with zeroes. In that event, the normal timing of the switch $S_2$ will ensure that channel B is reinitialized prior to computing a valid output.

It is to be understood that with either of the above described startup procedures, the first 2N-1 outputs are invalid and, therefore, should be ignored.

In the event that computing device 201 is used alone, in conjunction with switches $S_1$ and $S_3$, it is clear that the device 201 is periodically reinitialized, thus providing a lower error rate at the output. However, the output signal is intermittently interrupted during such reinitialization. This approach is useful where the output is not always needed and may be regularly disconnected.

Figure 8:
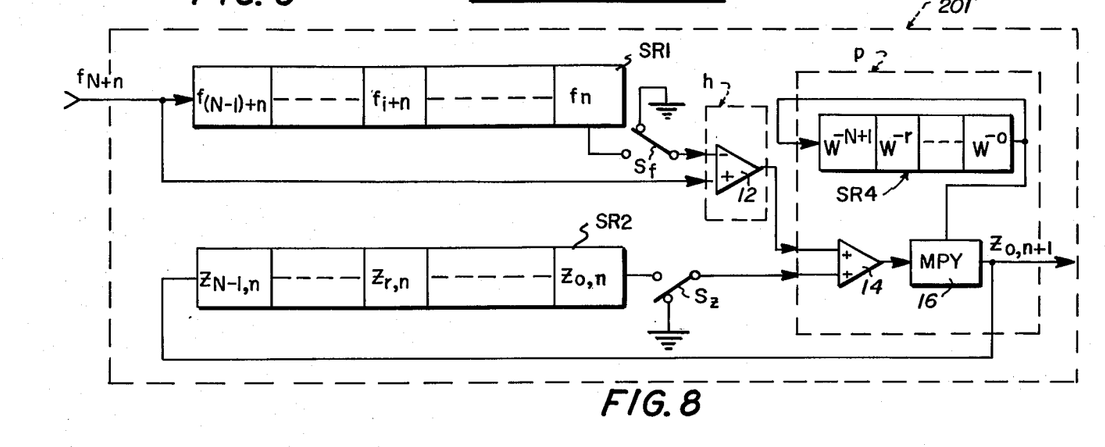
FIGS. 8 and 9 show a modification of the invention, providing an alternate means for limiting error accumulation.
Figure 9:
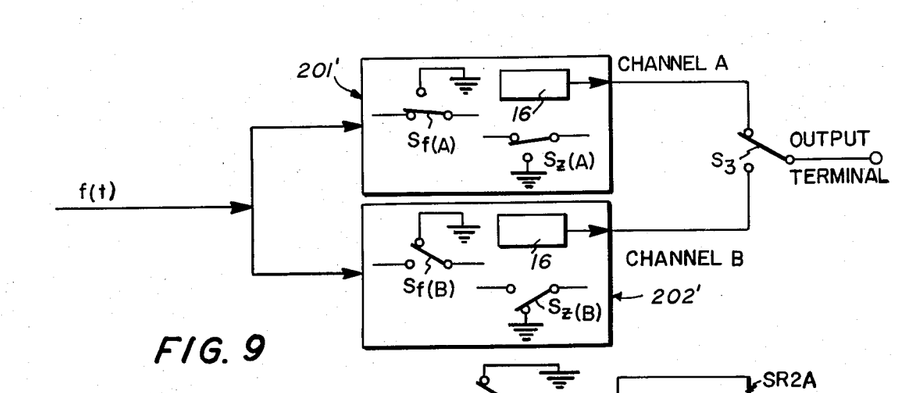
Figure 10:
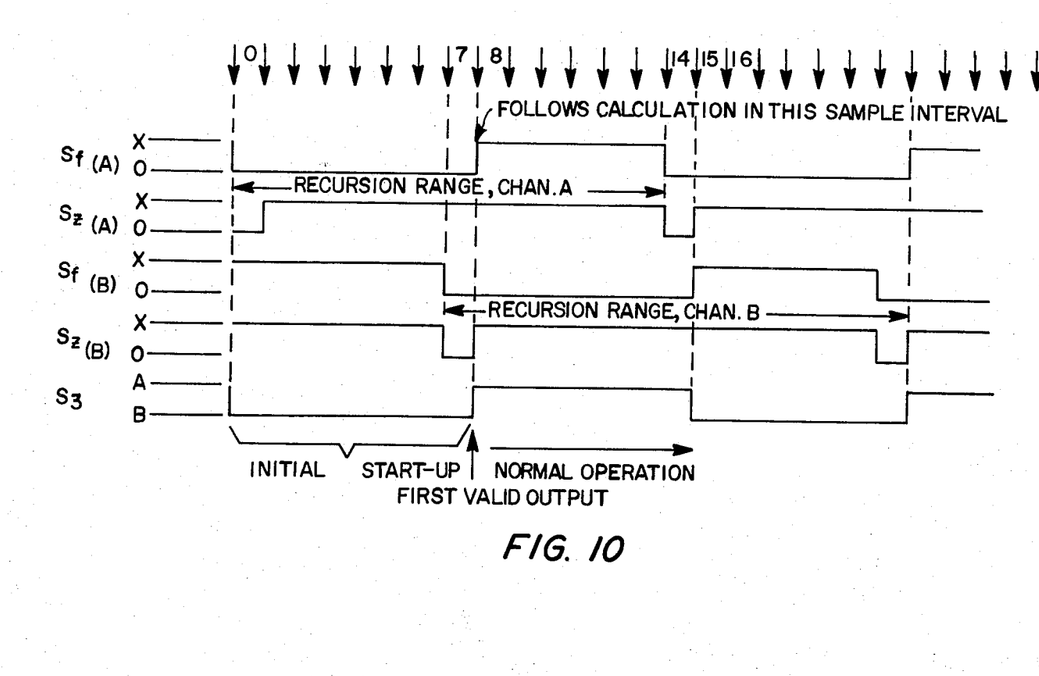
FIG. 10 is a timing diagram for the switches shown in FIGS. 8 and 9.

An alternate embodiment of FIGS. 5 and 6 is shown in FIGS. 8 and 9, respectively. Devices 201' and 202' are shown connected together in FIG. 9, much in the same manner as the devices 201 and 202 of FIG. 6. Switches $S_1$ and $S_2$ of FIG. 6 are, however, replaced in FIG. 9 by connecting separate switches $S_f$ between the last stage of the shift register SR1 for each channel and the subtractor 12. The switches $S_f$ are periodically connected to zero (ground), thereby avoiding the necessity of shifting zero values into the shift registers SR1 of channels A and B. As before, zeroes are applied to subtractor 12 for N sample intervals, while adder 14 receives initializing zero values via switch $Z_Z$ on the first of the N sample intervals. The utilization of the switches $S_f$ in devices 201' (channel A) and 202' (channel B) of FIG. 9 not only eliminates the need for actually shifting zero values into the input shift registers SR1, but also the necessity of clearing those zero values by subsequently shifting in new sample values. As confirmed by FIG. 10, which is a simplified timing diagram for the devices 201' and 202', the error accumulation in the embodiment of FIG. 9 is limited to 2N-2 recursions, rather than to 3N-2 recursions as with the embodiment of FIG. 6.

Figure 11:
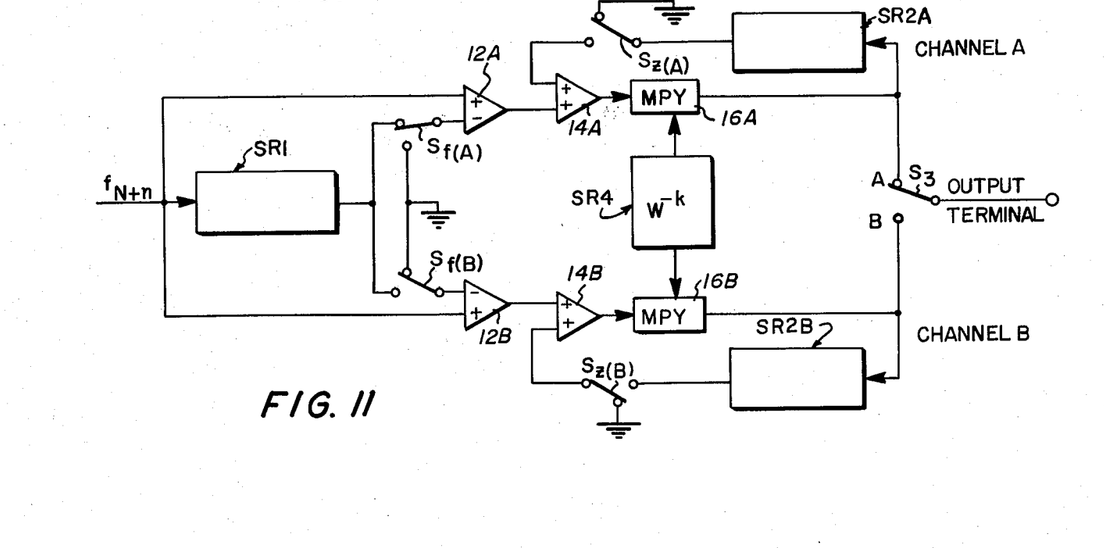
FIG. 11 illustrates a simplified embodiment of the invention as illustrated in FIGS. 8 and 9.

Yet another embodiment of the invention is shown in FIG. 11, which essentially eliminates the redundant usage of separate shift registers SR1 and SR4 for each of the channels A and B as in FIGS. 8 and 9. In FIG. 11, the switches and registers are now labeled by a suffix A or B to indicate the associated channel. The timing diagram for the operation of the switches is the same as in FIG. 10.

Figure 12:
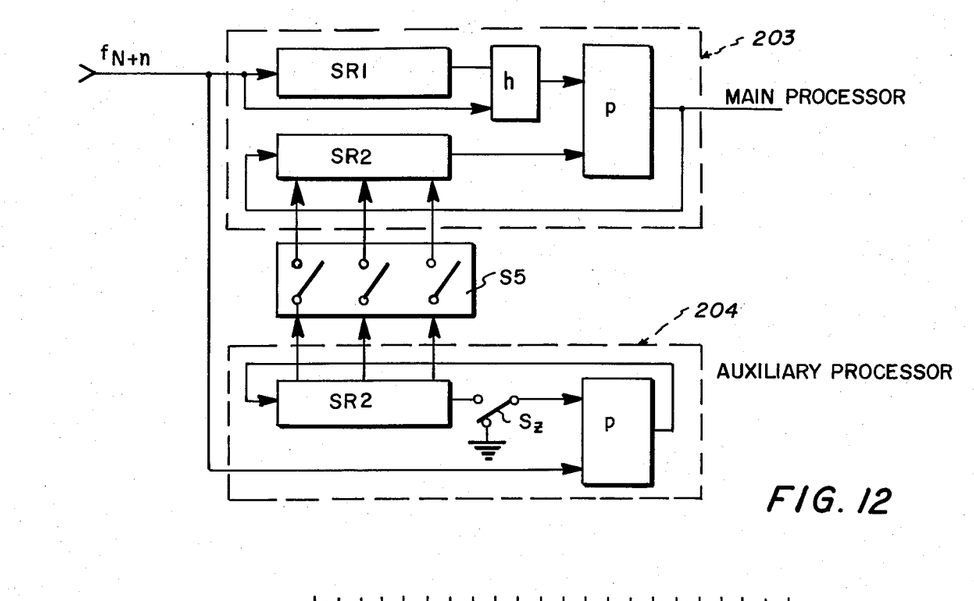
FIG. 12 illustrates another embodiment of the invention.

FIG. 12 is a modification of FIGS. 8 and 9 wherein channel A comprises an on-line main computing device or processor 203, and channel B comprises an off-line auxiliary computing device or processor 204. The main computing device 203 of channel A is in the on-line path to the output, but performs only the recursive computation of the MWDFT-viz., the computation of equation (7). The auxiliary computing device 204 of channel B is isolated from the output, but performs the computation of the reconstituted spectral coefficients-viz., the computation of equation (8) and (9). Excessive accumulation of error in channel A is prevented by periodically replacing the spectral values in channel A by newly reconstituted values from channel B.

The shift register SR1, as well as the h function generator, are not needed in the auxiliary processor 204. The p function generator for the processor 204 is the same as shown in FIG. 8. Thus, upon connection of switch $S_z$ to ground (zero), equation (8) is implemented by the auxiliary processor 204. The switch $S_Z$ is subsequently connected to receive the contents of the shift register SR2, thereby implementing equation (9), and the reconstruction of the spectral coefficients then continues during the next N-1 sample intervals. As soon as a valid spectrum is available in the auxiliary processor 204, the spectrum is shifted into register SR2 of the main processor 203, thus replacing the existing spectrum within the main processor 203 and the excess accumulated errors associated therewith. The main processor 203 continues with the new or corrected spectrum as its base while the auxiliary processor reinitializes. N valid data samples later, the auxiliary processor 204 once again contains a valid spectrum ready to be transferred into the shift register SR2 of the main processor 203 so that the process may be repeated. Again, single-pole switches $S_z$ and $S_5$ are shown, but other devices may be used. The shifting of spectrum data from processor 204 to processor 203 is shown as a parallel shift, but other approaches may be utilized.

Figure 13:
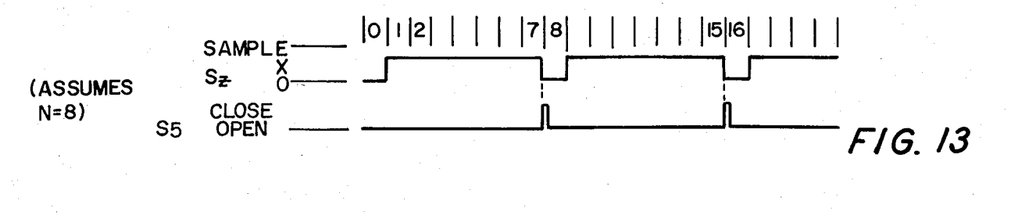
FIG. 13 is a timing diagram for the embodiment of FIG. 12.

FIG. 13 shows a timing diagram for the operation of the switches of the embodiment shown in FIG. 12. When the auxiliary processor 204 has processed the requisite number of valid samples, switches $S_5$ are activated to transfer the data from the register SR2 in processor 204 to the register SR2 in processor 203. That transfer is carried out rapidly in the interval between the serial shifts of the registers SR2.

Of course, the transfer from Channel B to Channel A must occur after Channel B has first performed equation (8) at least once and then performed equation (9) exactly N-1 times because Channel B is not capable of implementing equation (7).

Figure 14:
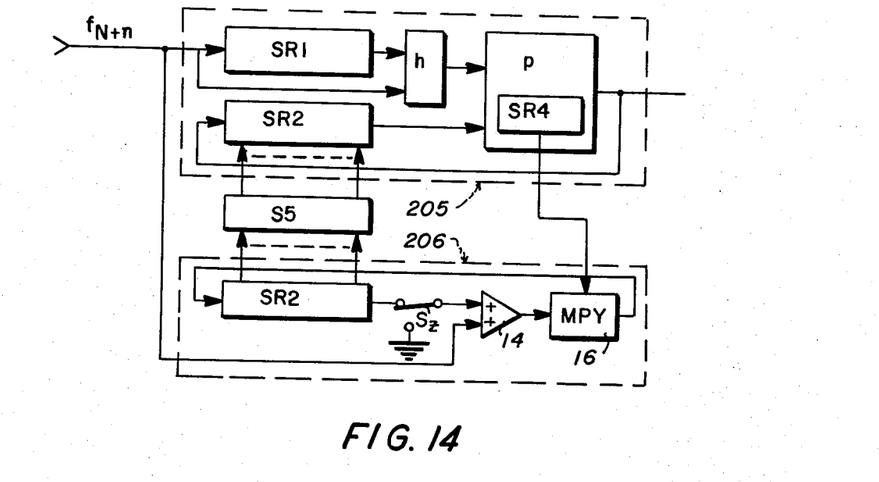
FIGS. 14 and 15 show further modifications to the embodiment of FIG. 12.

FIG. 14 shows the apparatus of FIG. 12 with a savings in hardware realized by sharing shift register SR4 in function generator p of processor 205 for the computations in auxiliary processor 206. This may be done inasmuch as the sequence of constants contained in shift register SR4 is the same for both of the processors 205 and 206.

Figure 15:
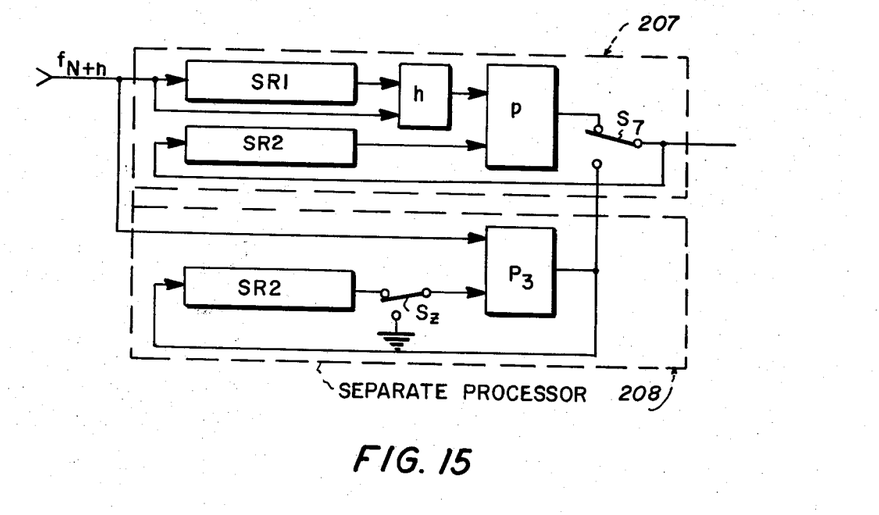

FIG. 15 illustrates another modification of the embodiment shown in FIG. 12. In FIG. 15, there is a switch $S_7$ for alternately connecting the system output and the input of the shift register SR2 of a processor 207 to (a) the output of function generator p in the processor 207 or (b) the output of a separate function generator P3 in another processor 208. Accordingly, the output spectrum generated by processor 207 is reinitialized over N shifts of $_o$ the register SR2 of the processor 208, rather than relying on simultaneous reinitialization as in FIGS. 12 and 14.

Having described specific embodiments of the invention, many alternatives, modifications, and equivalents will become apparent to practitioners of ordinary skill in the art.

What is claimed is:

1. Apparatus for recursively calculating values for a serial output signal, said apparatus comprising the combination of input function generator means for serially generating successive input functions in response to successive input signal sample sets;

output function generator means coupled to said input function generator means for recursively calculating said serial output signal values in response to said successive input functions and successive sets of previously calculated output signal values;

feedback means coupled to said output function generator means for sequentially accumulating said successive sets of previously calculated output signal values for said output function generator means; and refresh means coupled to said feedback means for periodically substituting a set of independently calculated output signal values for a corresponding one of said sets of previously calculated output signal values, whereby any accumulation of recursive computation errors in said output signal values is limited.

2. The combination of claim 1 wherein said feedback means comprises storage means for sequentially storing said successive sets of previously calculated output signal values, and said refresh means comprises means for periodically loading an independently calculated set of output signal values into said storage means in lieu of a previously calculated set of output signal values.

3. The combination of claim 2 wherein said independently calculated output signal values are initialization values for said output function generator means, whereby said output function generator means is periodically reinitialized to recursively calculate mutually independent groups of serial output signal values.

4. The combination of claim 3 further including means coupled to said input function generator means for periodically reinitializing said input function generator means in timed synchronism with the reinitialization of said output function generator means so that the recursive calculation of each of said groups of output signal values is initially based on a set of reinitializing input signal samples and a set of reinitializing output signal values.

5. The combination of claim 4 wherein said input signal sample sets are moving window sample sets so that each new input sample set is formed by adding one new input sample to an existing input sample set while eliminating the oldest sample of the existing sample set, and wherein a complete set of output signal values are generated in reponse to each input signal sample set; each of the output signal values for any given time frame n+1 being dependent on all of the samples of the input signal sample set for the immediately proceeding time frame n and on the first sample of the input sample set for the given time frame n+1.

6. The combination of claim 3 wherein said input function generator means, said output function generator means, said feedback means, and said refresh means are in a first channel; and further including at least one additional channel comprising generally identical input function generator means, output function generator means, feedback means, and refresh means;

an output terminal; and switch means for alternately and cyclically connecting and disconnecting said first channel and said additional channel to and from, respectively, said output terminal;

said refresh means of said first and said additional channels being time synchronized with said switch means to periodically reinitialize the output function generator means of said channels in time staggered relationship and while the channel containing the output function generator being reinitialized is disconnected from said output terminal so that the other channel is then on-line to maintain a continuous flow of recursively calculated output signal values to said output terminal.

7. The combination of claim 6 further including at least one input shift register for sequentially storing the successive input signal sample sets; and wherein said input shift register has parallel outputs coupled to simultaneously apply the first samples of the input signal sample sets for the $n^{th}$ and the $(n+1)$th time frames to the input function generator means of at least one of said channels, where n is a time frame index;

said output function generator for said one channel generates a complete set of N output signal values for a given time frame n+1 in dependence on the first samples of the input signal sample sets for said time frames n and n+1; and said first samples are time displaced from each other by N input signal sampling time slots.

8. The combination of claim 7 further including means coupled to said input function generator means for periodically applying separate sets of reinitializing input signal samples to the input function generator means of said first and said additional channels in time staggered relationship and in timed synchronism with the reinitialization of the output function generator means of said first and said additional channels, respectively, whereby said channels provide time staggered and mutually independent groups of recursively calculated output signal values such that the recursive calculation of each of said groups of output signal values is initially based on a set of reinitializing input signal samples and a set of reinitializing output signal values.

9. The combination of claim 8 wherein said channels comprise individual input shift registers, and the input shift registers of said first and said additional channels each have parallel outputs coupled to simultaneously apply the first samples of the sample sets for said time frames n and n+1 to the input function generator means of said first and said additional channels, respectively.

10. The combination of claim 9 further including additional switch means coupled between the input shift register and the input function generator means of each of said channels for periodically and in time staggered relationship supplying the input function generator means of said first and said additional channels with reinitializing input signal samples in lieu of the first sample of N successive input signal sample sets, whereby said input function generator means of said first and said additional channels are periodically reinitialized in time staggered relationship.

11. The combination of claim 7 wherein said first and said additional channels share a single input shift register having one input coupled to simultaneously apply the first sample of the input signal sample set for said given time frame n+1 to the input function generator means of each of said channels and another output coupled to supply the first sample of the input signal sample set for said preceeding time frame n; and further including additional switch means coupled between the other output of said shift register and the input function generator means of each of said channels for periodically and in time staggered relationship supplying the input function generator means of said first and said additional channels with reinitializing input signal samples in lieu of the first samples of N successive input signal sample sets, whereby said input function generator means of said first and said additional channels are periodically reinitialized in time staggered relationship.

12. The combination of claim 7 wherein each of said input function generator means comprises a subtractor means for supplying a difference signal representing the difference between the first samples of input signal sample sets for said given and immediately preceeding time frames n+1 and n; and each of said output function generator means comprises additional storage means for storing a plurality of predetermined constants, summing means coupled to said subtractor means and to said feedback means for generating a sum signal representing the sum of said difference signal plus successive ones of said output signal values, and multiplier means coupled to said additional storage means and to said summing means for generating said output signal values as the product of said sum signal multiplied by successive ones of said predetermined constants;

said output signal values being sequentially applied to said summing means at a rate N times faster than the rate at which said successive input signal sample sets are formed, whereby the difference between the first samples of input signal sample sets for successive time frames n and n+1 is sequentially summed with all of the output signal values for said time frame n; and said predetermined constants being sequentially applied to said multiplier means at the same rate as said output signal values are applied to said summing means and being selected to cause said output signal values to normally represent the discrete Fourier transform of said input signal.

13. The combination of claim 12 wherein said output signal values, $Z_{k,n+1}$, comprise components of a moving window discrete Fourier transform of said input signal represented by $$Z_{k,n+1} = (z_{k,n} + f_{N+n} - f_n)W^{-k}$$

and said predetermined constants $W^{-k}$ are a sequence of discrete phase factors, where
$W = \exp. -j2\pi/N;$
$j = \sqrt{-1}$
$k =$ any one or more integers, $0 \leq k \leq N-1;$
$f_n =$ an input signal sample obtained in the first time slot of the $n^{th}$ time frame;
$f_{N+n} =$ an input signal sample obtained in the first time slot of the next time frame n+1.

14. The combination of claim 13 wherein said channels comprise individual input shift registers for storing said successive input signal sample sets, the input shift registers of said first and said additional channels having outputs for applying the first, samples $f_n$ and $f_{n+N}$ of the input signal sample sets for said successive time frames n and n+1 to the subtractors mean of said first and said additional channels; and further including additional switch means coupled between the input shift registers and the subtractor means of each of said channels to periodically and in time staggered relationship apply reinitializing input signals to the subtractor means of said first and said additional channels in lieu of the first samples of N successive input signal sample sets, whereby the subtractor means of said first and said additional channels are periodically reinitialized in time staggered relationship.

15. The combination of claim 14 wherein the refresh means of said first and said additional channels are synchronized with said additional switch means to periodically and in time staggered relationship load a set of reinitializing output signal values into the feedback means of said first and said additional channels in lieu of the set of output signal values calculated during the time frame the $N^{th}$ of said reinitializing input sample values is applied to the subtractor means of said first and said additional channels, respectively, thereby limiting the accumulation of recursive calculation errors.

16. The combination of claim 15 wherein each of said feedback means comprises another shift register for storing said successive sets of output signal values, and each of said additional storage means comprises a further shift register; said input shift registers each shift once per time frame, and said other and said further shift registers each shift N times faster than said input shift registers.

17. The combination of claim 13 wherein said first and said additional channels share a single input shift register having one input coupled to simultaneously apply the first sample of the input signal sample set for the given time frame n+1 to the subtractor means of each of said channels and another output coupled to supply the first sample of the input signal sample set for the preceeding time frame n; and further including additional switch means coupled between the other output of said input shift register and the subtractor means of each of said channels for periodically and in time staggered relationship supplying the subtractor means of said first and said additional channels with reinitializing input signal samples in lieu of the first samples of N successive ones of said preceeding input signal sample sets, whereby said subtractor means of said first and said additional channels are periodically reinitialized in time staggered relationship.

18. The combination of claim 17 wherein the refresh means of said first and said additional channels are synchronized with said additional switch means to periodically and in time staggered relationship load a set of reinitializing output signal values into the feedback means of said first and said additional channels in lieu of the set of output signal values calculated during the time frame the $N^{th}$ of said reinitializing input sample values is applied to the subtractor means of said first and said additional channels, respectively, thereby limiting the accumulation of recursive calculation errors.

19. The combination of claim 17 wherein each of said feedback means comprises another shift register for storing said successive sets of output signal values, and each of said additional storage means comprises a further shift register; said input shift register shifts once per time frame, and said other and said further shift registers each shift N times faster than said input shift registers.

20. The combination of claim 2 wherein said refresh means comprises auxiliary function generator means for recursively calculating auxiliary output signal values in response to said successive input sample sets, means for periodically reinitializing said auxiliary function generator means at a rate selected to enable said auxiliary function generator means to calculate a complete set of auxiliary output signal values before being reinitialized, and means for transferring each complete set of auxiliary output signal values from said auxiliary function generator means to said feedback means for use by said output function generator means in lieu of a previously calculated set of output signal values, thereby limiting the accumulation of recursive computation errors in the output signal values generated by said output function generator.

21. The combination of claim 20 wherein said auxiliary function generator means comprises auxiliary storage means for accumulating successive sets of previously calculated auxiliary output signal values, and auxiliary output function generator means for calculating said auxiliary output signal values in response to said previously calculated auxiliary output signal values and the first samples of said successive input signal sample sets; and said means for reinitializing said auxiliary function generator means comprises auxiliary switch means coupled between said auxiliary storage means and said auxiliary output function generator means for periodically applying a series of initializing signal values to said auxiliary output function generator means in lieu of said previously calculated auxiliary output signal values.

22. The combination of claim 21 wherein said means for transferring said auxiliary output signal values comprises means coupled between said auxiliary storage means and said feedback means for periodically transferring a complete set of auxiliary output signal values in parallel from said auxiliary storage means to said feedback means.

23. The combination of claim 21 wherein said means for transferring said auxiliary output signal values comprises auxiliary switch means for selectively coupling said feedback means to said output function generator means and to said auxiliary output function generator means, said auxiliary switch means periodically completing a path from said auxiliary function generator means to said feedback means for serially loading a set of auxiliary output signal values into said feedback means in lieu of said previously calculated output signal values.

24. The combination of claim 21 wherein said input function generator means comprises a subtractor means for supplying a difference signal representative of the first samples of said successive input signal sample sets for successive time frames n and n+1, where n is a time frame index;

said output function generator means comprises additional storage means for storing a plurality of predetermined constants, summing means coupled to said subtractor means and to said feedback means for generating a sum signal representing the sum of the difference signal generated during any given time frame n+1 with successive ones of the output signal values accumulated during the preceeding time frame n, and multiplier means coupled to said additional storage means and to said summing means for multiplying the sum signal generated during successive time slots of said given time frame n+1 with successive ones of said predetermined constants to provide product signals as the output signal values for said given time frame n+1; said predetermined constants being selected to cause said output signal values to represent the discrete Fourier transform of said input signal; and said auxiliary function generator means comprises an auxiliary summing means having one input coupled to serially receive the first sample of successive input signal sample sets and another input coupled through said auxiliary switch means to said auxiliary storage means, whereby said auxiliary summing means provides a sum signal which alternately and periodically represents the sum of the first sample of the input signal sample set for a given time frame n+1 with successive ones of said previously calculated auxiliary output signal values and at other times the first sample of the input sample sets for another of said time frames with successive ones of said initializing signal values, and auxiliary multiplier means coupled to said summing means and to said additional storage means for multiplying said sum signal by successive ones of said predetermined signals to serially generate said auxiliary output signal values.

25. The combination of claim 24 wherein said output signal values, $Z_{k,n+1}$, comprise components of a moving window discrete Fourier transform of said input signal represented by $$Z_{k,n+1} = (Z_{k,n} + f_{N+n} - f_n)W^{-k}$$

and said predetermined constants $W^{-k}$ are a sequence of discrete phase factors, where $W = \exp. -j2\pi/N;$
$j = \sqrt{-1}$
$k$ = any one or more integers, $0 \leq k \leq N-1$;
$f_n$ = an input signal sample obtained in the first time slot of the preceeding time frame n;
$f_{N+n}$ = a input signal sample obtained in the first time slot of the given time frame n+1;

and said auxiliary output signal values, $Z_{k,n+1}'$, are periodically recursively calculated from an initialized form of the discrete Fourier transform $$Z_{k,n+1}' = (0 + f_{N+n} + 0)W^{-k}.$$

26. The combination of claim 25 further including an N-stage input shift register for storing said successive input signal sample sets during successive time frames; said feedback means and said auxiliary storage means comprise first and second further N-stage shift registers for storing the output signal values and the auxiliary output signal values, respectively, generated during successive time slots of successive time frames; and said additional storage means comprises a recirculating N-stage shift register for storing said predetermined constants; said input shift register shifting once per time frame, and said first and second shift registers and said recirculating shift register each shifting N times faster than said input shift register.

27. In a method for recursive computation of a variable functionally dependent on observed samples, said method comprising the steps of storing said observed samples,
performing a computation on said observed samples to produce a first signal, and
producing said variable as a function of
said first signal,
a plurality of constants, and
previously produced and stored values of said variable;

the improvement comprising the step of periodically substituting reinitialized error limited values for said previously produced values.

28. The method as recited in claim 27, wherein said observed samples are samples of a time function; said step of performing a computation of said samples comprises obtaining a difference between two observed samples;

said plurality of constants comprise a set of exponentials $W^{-k}$ defined by $W = \exp. -j2\pi/N$ where: $j = \sqrt{-1}$, and $0 \leq k \leq N-1$; and said step of producing said variable as a function of said first signal and said plurality of constants comprises the steps of adding a previously produced stored value of said variable to said first signal to produce a second signal, and multiplying said second signal by one of said plurality of constants to produce a value of said variable, whereby said variable is a moving window discrete Fourier transform of said time function.

29. The method as recited in claim 28 further comprising the steps of shifting said observed and stored samples once each time a new sample is observed, shifting said plurality of constants in a cyclic fashion in synchronism with a shifting of said previously produced and stored values of said variable each time said multiplying step is performed, and performing said multiplying step N times every time a new sample is observed, whereby the moving window discrete Fourier transform is computed according to the recursive equation $$Z_{k,n+1} = (Z_{k,n} + f_{n+N} - f_n)W^{-k}$$

with periodically reinitialized values of the dependent variables $Z_{k,n}$, where, $f_n$ = a sample observed at an $n^{th}$ sample time $f_{N+n}$ = a sample observed N-sampling times later, and $Z_{k,n+1}$ is the kth component of the moving window discrete Fourier transform of the sequence of samples observed from the (n+1)th sample time through the (N+n)th sample time.

* * * * *